United States Patent [19]

Jones

[11] Patent Number: 5,223,024
[45] Date of Patent: Jun. 29, 1993

[54] HYDROMETALLURGICAL COPPER EXTRACTION PROCESS

[75] Inventor: David L. Jones, Delta, Canada

[73] Assignee: Cominco Engineering Services Ltd., Vancouver, Canada

[21] Appl. No.: 901,097

[22] Filed: Jun. 19, 1992

[51] Int. Cl.$^5$ .............................................. C22B 1/00
[52] U.S. Cl. ...................................... 75/743; 75/726; 75/740; 423/27
[58] Field of Search ...................... 75/726, 740, 743; 423/27

[56] References Cited

U.S. PATENT DOCUMENTS

| | | | |
|---|---|---|---|
| 3,896,208 | 7/1975 | Dubeck | 423/27 |
| 4,017,309 | 4/1977 | Johnson | 75/101 R |
| 4,120,935 | 10/1978 | Fountain et al. | 423/41 |
| 4,266,972 | 5/1981 | Redondo-Abad et al. | 75/101 R |
| 4,971,662 | 11/1990 | Sawyer | 75/743 |

OTHER PUBLICATIONS

Chapter 25.1 "Commercial Processes For Copper" from the *Handbook of Solvent Extraction*, J. F. C. Fisher et al., 1985.

Chapter 33 "Oxidative Leaching of a Copper-Nickel Concentrate at Elevated Temperature" from *Leaching of Copper-Nickel Concentrate*, B. Yawney et al.

Primary Examiner—Peter D. Rosenberg
Attorney, Agent, or Firm—John Russell Uren

[57] ABSTRACT

A process for the extraction of copper from a copper ore or concentrate comprises first subjecting the ore or concentrate to agitation leaching at an elevated temperature and pressure in the presence of oxygen and water to obtain a resulting acidic leach liquor which contains dissolved copper. The acidity of the resulting acidic leach liquor is then reduced by affecting percolation leaching of a bed of low grade copper ore or waste rock with the resulting acidic leach liquor, whereby the pH of the leach liquor is raised, for example to a value of about 1.5 to 2. In a preferred embodiment the bed of low grade ore or waste rock is in the form of a heap and the percolation leaching comprises heap leaching.

15 Claims, 1 Drawing Sheet

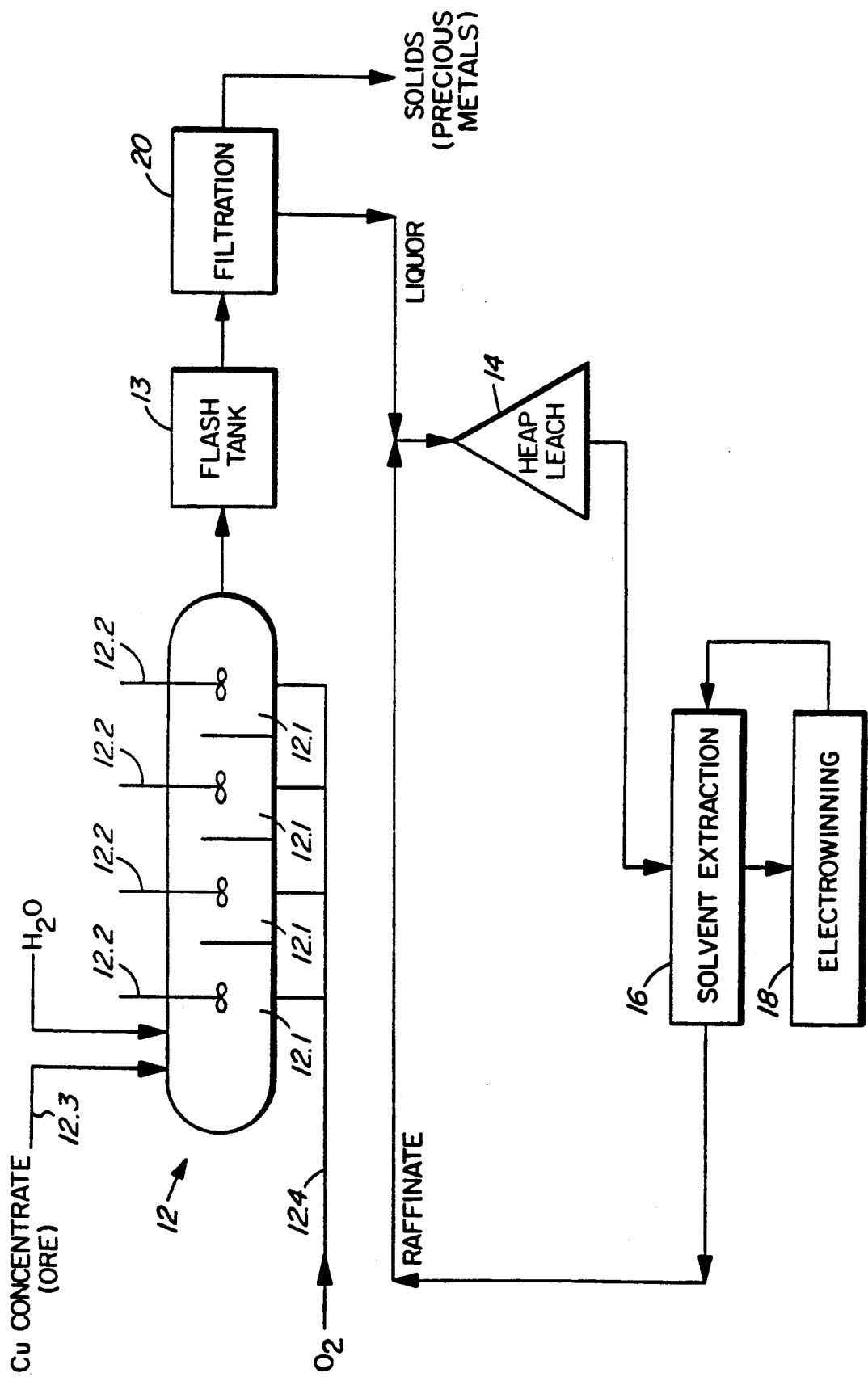

HYDROMETALLURGICAL COPPER EXTRACTION PROCESS

FIELD OF THE INVENTION

This invention relates to a process for the extraction of copper from copper ore or concentrates, in particular sulphide ores, in which the concentrate is subjected to acid leaching to extract the copper therefrom.

BACKGROUND OF THE INVENTION

Most copper ores or concentrates from which copper is extracted on a commercial scale contain copper in sulphide form, such as $CuFeS_2$ (chalcopyrite), $Cu_5FeS_4$ (bornite) and $Cu_2S$ (chalcocite) (hereinafter referred to as "sulphide ores"), as opposed to copper in oxide form (hereinafter referred to as "oxide ores").

Extraction processes for copper may be broadly classified into two categories, i.e. smelting and leaching. In general, smelting processes are applied to sulphide ores, whereas leaching is more often used with oxide ores. It is noted that the preliminary step of concentration of ores (by flotation) is usually applied to sulphide ores, not oxide ores.

The reasons for the differing treatment for the two types of ores are generally technical, and thus also economic. Sulphide ores float well, producing relatively high grade concentrates from low grade ores. These sulphide concentrates are well suited to the proven smelting process. Oxide ores on the other hand, do not concentrate easily and therefore it is difficult to provide a feed material that is sufficiently high grade for smelting. In addition, oxide ores do not have any natural fuel, comparable to the sulphur in sulphide concentrates. Fortunately though, oxide ores do leach easily in sulphuric acid solutions, and thus a sizeable industry has been established based on heap leaching of oxide ores, followed by solvent extraction and electrowinning.

Despite all of the above, smelting of sulphide ores has some serious drawbacks, mostly concerned with the need to avoid air pollution due to the sulphur gases emitted. In locations where there is no market or use for sulphuric acid, it is very difficult to justify a smelter on economic grounds, assuming it is not permitted to vent the gases freely to the atmosphere. Copper mines which produce sulphide concentrates in such locations usually ship the concentrates to distant (offshore) smelters. When smelting/refining/shipping charges are low, this may be economic, but there are times when the available world smelting capacity for custom concentrates is limited and, consequently, smelting charges rise sharply according to the law of the marketplace. At such times, concentrate producers may be placed at a severe disadvantage.

Therefore there is a need for an economic and technically sound leaching process that can treat sulphide concentrates at the mine site, particularly concentrates based on chalcopyrite, as this is the most widely distributed copper mineral worldwide.

One of the problems which arises with the leaching of copper from sulphide ore is that, while a high acid concentration is desirable during the leaching stage, such a high concentration is undesirable during the subsequent solvent extraction stage, due to unfavourable equilibrium conditions which are created and leading to higher equipment and working costs. This requires neutralization in order to yield a pregnant liquor suitable for solvent extraction, rendering the process uneconomical, in particular where low grade ores are involved.

It is accordingly an object of the present invention to alleviate the above-mentioned difficulties.

SUMMARY OF THE INVENTION

According to one aspect of the invention, there is provided a process for the extraction of copper from a copper ore or concentrate, comprising the steps of subjecting the ore or concentrate to agitation leaching at an elevated temperature and pressure in the presence of oxygen and water to obtain a resulting acidic leach liquor containing dissolved copper; and thereafter reducing the acidity of the resulting acidic leach liquor by effecting percolation leaching of a bed of low grade copper ore with said resulting acidic leach liquor, whereby the pH of the leach liquor is raised.

In a preferred embodiment the bed of low grade copper ore is in the form of a heap and the percolation leaching comprises heap leaching.

The agitation leaching is preferably carried out in an autoclave maintaining about 10–20% solids content for a residence time of about 0.5 to 2 hours.

According to another aspect of the invention, there is provided a process for the extraction of copper from a copper ore or concentrate, comprising the steps of subjecting the ore or concentrate to agitation leaching at an elevated temperature and pressure in the presence of oxygen and water to obtain a resulting acidic leach liquor containing dissolved copper; and thereafter reducing the acidity of the resulting acidic leach liquor by effecting percolation leaching of a bed of granulated rock with said resulting acidic leach liquor, whereby the pH of the leach liquor is raised.

Further objects and advantages of the invention will become apparent from the following description of a preferred embodiment of the invention.

BRIEF DESCRIPTION OF DRAWING

The single drawing is a flow diagram illustrating, by way of example, a copper extraction process according to the invention.

DETAILED DESCRIPTION OF PREFERRED EMBODIMENT

In order to be amenable to treatment by the process of the invention, the copper ore or concentrate must be in finely divided particulate form. It is preferable, that the starting material be at least 90% minus 325 mesh standard Tyler screen. In preparing a copper ore or concentrate for carrying out the extraction process, the concentrate is therefore reground, if necessary, to obtain a finely divided concentrate slurry with a moisture content of typically about 20–30%.

The concentrate slurry is then subjected to leaching with water in the presence of oxygen in an autoclave 12. The leaching is carried out at an elevated temperature, e.g. of about 180° C.–220° C., preferably about 200° C., and an oxygen partial pressure of about 150–300 psig. Water is continuously added during the pressure leaching process and a solids content of about 10–20% is maintained. The residence time in the autoclave 12 of about 0.5 to 2 hours under vigorous agitation.

The pressure leaching process can be carried out in one or more autoclaves. The autoclaves may be of the conventional type having several internal compartments, e.g., from two to eight, typically four, and provided with agitators in the compartments. In the present example a single autoclave 12 having four compartments 12.1, each provided with an agitator 12.2, is shown. The ore is introduced through feedline 12.3 and oxygen under pressure is introduced through feedline 12.4. Water is introduced through feedline 12.5.

As an example of a typical reaction taking place in the autoclave 12, during the leaching process, the following equation is given:

$$4CuFeS_2 + 17O_2 + 4H_2O \rightarrow 4CuSO_4 + 4H_2SO_4 + 2Fe_2O_3$$

Iron is precipitated as hematite, whereas copper is dissolved and sulphuric acid is formed during the leaching process. If desired, additional acid may be added to the autoclave 12, e.g. to dissolve the iron oxide, if desired. The product slurry will typically contain in the solution about 20-200 g/liter Cu, 0.1-100 g/liter Fe and about 20-100 g/liter $H_2SO_4$. Depending on the final acidity of the solution, any iron present will precipitate out or remain in the solution.

The product slurry from the autoclave 12 is flashed down to atmospheric pressure in a flash tank 13 operating at about 90° C.-100° C.

The product slurry is then directed to a heap 14 for carrying out a heap leaching process. The heap 14 is in a closed circuit operation with a solvent extraction plant 16 in which the solvent extraction raffinate (aqueous stream left over after the copper has been extracted) is recycled to the top of the heap 14. The solvent extraction plant 16 in turn is in a closed circuit operation with an electrowinning plant 18.

The product slurry, which also includes all the solids produced by the agitation leaching process, such as iron solids and gangue minerals (silica, etc.) is first filtered, as shown at 20 in the drawing, and then the filtrate or product liquor is mixed with the recycled solvent extraction raffinate, prior to being applied to the heap 14, in a ratio of about 1:50, i.e. one part product slurry to about 50 parts raffinate by weight. However, it is conceivable that a ratio in a broader range of from about 1:50 to about 1:500 may be used.

The heap leaching process is carried out primarily to neutralize and filter the product liquor rather than for the purpose of leaching copper values from the heap itself, which, in the present example, comprises ordinary waste rock normally generated by a copper mine, or low grade copper ore piled up in dumps as run-of-mine waste. Such waste is uncrushed and typically contains large boulders of up to one meter across, together with considerable fine material. Copper values in most waste ore from open pit mines in British Columbia, Canada, is typically about 0.1% Cu. However, copper values can be higher in other countries. Therefore, despite the fact that the main purpose is not to recover copper from the heap 14 itself, some useful leaching can take place. Any leaching which does take place is enhanced by the addition of the product slurry to the raffinate because it increases the acidity as well as the iron levels in the liquor being sprayed onto the heap 14. The low grade ore in the heap 14 may be sulphide ores or oxide ores, or both.

By passing the product slurry through the heap 14, neutralization of the acid and removal of dissolved iron in the leach liquor by the minerals in the waste rock is achieved. It has been found that in such heap leaching situations, an equilibrium condition appears to be established between the leach liquor and the heap 14 regarding acid and iron content. Thus, irrespective of the acid and iron content of the product slurry being poured onto the heap 14, and irrespective of the make-up of the waste heap 14, the acid and iron content of the resultant leach liquor coming off the bottom of the heap 14 is relatively constant in composition at about pH 1.5-2.0 and about 1-2 g/liter Fe.

A possible explanation for this phenomenon is that minerals normally found in waste rock, such as feldspars and clays, reach an equilibrium condition with the solution when a large excess of rock over the solution, e.g., of about 100:1, is present, so that the rock does not become saturated. The feldspars and clays slowly absorb or neutralize the acid from the leach liquor and the degree of this reaction is dependent upon the strength of the acid solution. The net result is that the resultant pregnant leach liquor is always about the same in acidity and iron content. Therefore, the heap 14 may be composed of any rock which will serve this purpose and need not necessarily contain any copper ore.

The above explanation is given solely for the purpose of providing as much information as possible and is believed to be correct. However, in the event that in the future the explanation is found to be incorrect or imprecise, the applicant does not wish to be bound thereby.

The pregnant leach solution from the heap 14 is passed to the solvent extraction plant 16 and the electrowinning plant 18 to produce cathode copper. The raffinate is recycled to the top of the heap 14 as previously mentioned.

In tests about 98%-99% copper extraction has been achieved in the pressure leach stage.

In situations where the concentrate contains significant precious metal values, such as gold and silver, the process of the invention includes a filtration step or other liquid-solid separation means for the flash tank slurry before application thereof to the heap 14. The solids obtained during the filtration step can then be removed for further treatment in a refinery.

It is an advantage of the process according to the invention that by combining the pressure leaching step with a percolation leaching step involving low grade ore or waste rock, the neutralization of the product slurry is economically and effectively carried out without the need for extraneous neutralizing agents. An additional advantage is that further copper values are simultaneously recovered during the neutralization process in situations where low grade copper ore is used in the percolation leaching step.

The result of the above is that low grade ore, containing less than 0.25% copper and as low as 0.1% copper can be successfully processed, whereas processing of such ores with the conventional processes would be uneconomical.

While only a preferred embodiment of the invention has been described herein in detail, the invention is not limited thereby and modifications can be made within the scope of the attached claims.

What is claimed is:

1. A process for the extraction of copper from a sulphide copper ore or concentrate, comprising the steps of:
   subjecting the ore or concentrate to agitation leaching at an elevated temperature and pressure in the presence of oxygen and water to obtain a resulting acidic leach liquor containing sulphate and dissolved copper; and thereafter reducing the acidity of the resulting acidic leach liquor by effecting percolation leaching of a bed of low grade copper ore with said resulting acidic leach liquor, whereby the pH of the leach liquor is raised.

2. The process according to claim 1, further comprising a liquid-solid separation step after said agitation leaching to separate said acidic leach liquor from leach residue solids.

3. The process according to claim 2, further comprising the step of treating said leach residue solids to recover precious metal values therefrom.

4. The process according to claim 1, wherein said bed is in the form of a heap and said percolation leaching comprises heap leaching.

5. The process according to claim 4, further comprising the step of subjecting the leach liquor from the percolation leaching to a solvent extraction process to produce a copper concentrate solution and a resulting raffinate; and wherein said percolation leaching is carried out in a closed circuit operation with said solvent extraction, whereby the resulting raffinate is recycled to the heap.

6. The process according to claim 5, further comprising the step of mixing said recycled raffinate with said resulting acidic leach liquor in a ratio of about one part by weight leach liquor to about 50 parts raffinate by weight prior to said heap leaching.

7. The process according to claim 6, wherein said elevated pressure comprises an oxygen partial pressure of from about 150 psig to about 300 psig.

8. The process according to claim 7, wherein said elevated temperature is from about 180° C. to about 220° C.

9. The process according to claim 8, wherein said agitation leaching is carried out in an autoclave maintaining a solids content of about 10-20% for a residence time of about 0.5 to about 2 hours.

10. The process according to claim 9, further comprising the step of extracting dissolved iron in said leach liquor by subjecting the liquor to said percolation leaching.

11. The process according to claim 10, wherein the pH of the leach liquor is raised to a value of about 1.5-2.0 by said percolation leaching.

12. The process according to claim 11, wherein the concentration of dissolved iron in said leach liquor is lowered to a value of about 1-2 g/liter.

13. The process according to claim 12, further comprising the step of subjecting said copper concentrate solution after the solvent extraction to an electrowinning process to produce cathode copper.

14. A process for the extraction of copper from a sulphide copper ore or concentrate, comprising the steps of:
   subjecting the ore or concentrate to agitation leaching at an elevated temperature and pressure in the presence of oxygen and water to obtain a resulting acidic leach liquor containing sulphate and dissolved copper; and thereafter
   reducing the acidity of the resulting acidic leach liquor by effecting percolation leaching of a bed of granulated rock with said resulting acidic leach liquor, whereby the pH of the leach liquor is raised.

15. The process according to claim 14, wherein said bed is in the form of a heap of mine waste rock and said percolation leaching comprises heap leaching.

* * * * *